United States Patent [19]

Olson et al.

[11] Patent Number: 5,361,867
[45] Date of Patent: Nov. 8, 1994

[54] LOAD INDICATOR

[75] Inventors: Wayne L. Olson, Central Point, Oreg.; Gary E. Choate, Lakewood, Colo.

[73] Assignee: Rose Systems, Inc., Englewood, Colo.

[21] Appl. No.: 97,672

[22] Filed: Jul. 27, 1993

[51] Int. Cl.5 ............................................. A62B 33/00
[52] U.S. Cl. ..................................... 182/18; 248/542; 248/548; 116/203
[58] Field of Search ...................... 182/18, 3; 188/371, 188/376; 248/542, 548; 116/203

[56] References Cited

U.S. PATENT DOCUMENTS

| | | | |
|---|---|---|---|
| 2,391,275 | 12/1945 | Shaw | 188/371 X |
| 4,648,164 | 3/1987 | Hyodo et al. | 188/371 X |
| 5,220,977 | 6/1993 | Wolner | 182/18 |

Primary Examiner—Alvin C. Chin-Shue
Attorney, Agent, or Firm—Klaas, Law, O'Meara & Malkin

[57] ABSTRACT

A system for indicating the use of a fall arresting device to arrest a fall wherein a collapsible member is mounted on one of the load supporting members so that the collapsible member will collapse when a predetermined load has been applied thereto but will remain substantially in place to indicate that the predetermined load had been applied thereto.

13 Claims, 1 Drawing Sheet

LOAD INDICATOR

FIELD OF THE INVENTION

This invention relates generally to fall arresting devices used to protect workers from injury due to accidental falls and more specifically to a device for indicating that the fall arresting device has been used to arrest a fall.

BACKGROUND OF THE INVENTION

Fall arresting apparatus is used to permit a worker to perform tasks but to arrest the worker's fall when necessary. Therefore, from a safety viewpoint, it is essential that the fall arresting apparatus works as intended. When the fall arresting device has been used, it should be inspected to be assured that it has not been damaged to the extent that it will not function as intended. Due to human frailties, it is not unusual that an unnoticed fall that has been arrested by a fall arresting apparatus will not be reported so that the required inspection is not made. Therefore, it is desirable to provide a fall arresting apparatus with some readily visible structure to indicate that it had been used but that will not hinder or interfere with the normal operation of the fall arresting apparatus.

BRIEF DESCRIPTION OF THE INVENTION

This invention provides fall arresting apparatus having a fall line with a plurality of load supporting members attached thereto. A collapsible member is mounted on one of the load supporting members so that the collapsible member will collapse when a predetermined force is applied thereto but will remain substantially in place to indicate that the predetermined load had been applied thereto.

In a preferred embodiment of the invention, the device includes a load supporting member that is attached to the fall line of a fall arresting apparatus. The load supporting device has a base portion having at least one opening formed therein. A collapsible member is mounted on the load supporting member and has spaced apart portions adapted to contact the base portion. The collapsible member has an opening formed therein. Mounting means are provided for mounting the collapsible member on the load supporting member so that the spaced apart portions are at least adjacent to the base portion. Another load supporting member is attached to the fall line. Securing means are provided for securing at least a portion of the mounting means to at least a portion of the another load supporting member so that, when a predetermined force is applied to the another load supporting member, the predetermined force is transmitted to the collapsible member to collapse the collapsible member.

In a preferred embodiment of the invention, the collapsible member has a central body portion having an opening therein, with a pair of spaced apart integral leg portions projecting outwardly therefrom at an angle of about 90 degrees. An integral flange portion projects outwardly from each leg portion at an angle of about 90 degrees so that the flange portions extend in opposite directions. The integral portion between the leg portion and the flange portion is arcuate. The flange portions are adapted to contact the base portion when a force is applied to the collapsible member. The surfaces of the flange portion contacting the base member are chromated to have a distinctive color, such as red, so that when the collapsible member has been collapsed they are clearly visible.

The mounting means for mounting the collapsible member on the load supporting member have a head portion having a cross-sectional configuration greater than the cross-sectional configuration of the opening in the central body portion. A shank portion projects outwardly from the head portion and passes through the opening in the collapsible member and then through the at least one opening in the base portion. At least an outer portion of the shank portion is externally threaded so that it may be threadedly secured in an internally threaded opening in the another lead supporting member.

BRIEF DESCRIPTION OF THE DRAWINGS

An illustrative and presently preferred embodiment of the invention is shown in the accompanying drawing in which.

DETAILED DESCRIPTION OF THE INVENTION

Figure 1:
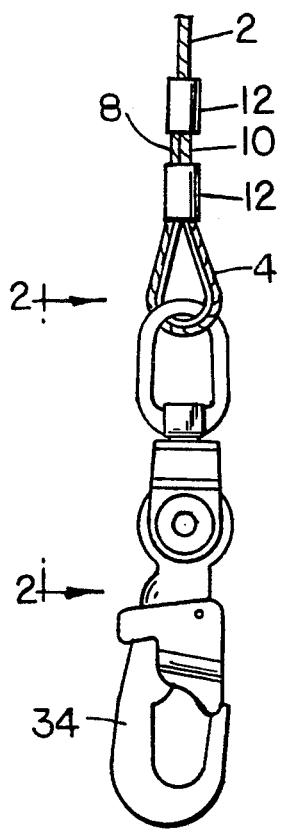
FIG. 1 is a front elevational view of a plurality of load supporting members at the end of a fall line.

In FIG. 1, there is illustrated a plurality of load supporting members attached to the end of a fall line 2 of a fall arresting apparatus, such as that described in U.S. Pat. No. 4,589,523, which is incorporated herein by reference thereto. A load supporting holder 4 is positioned on the load supporting swivel eye 6. The end portion 8 of the fall line 2 is passed around the load supporting holder 4 and bent back upon another portion 10 and locked together by locking means 12.

Figure 2:
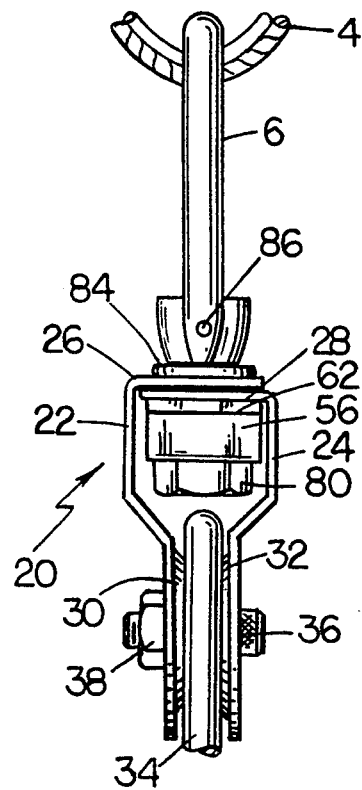
FIG. 2 is an enlarged side elevational view of the portion of FIG. 1 between the arrows 2—2 in FIG. 1 with the collapsible member in the non-collapsed condition.
Figure 3:
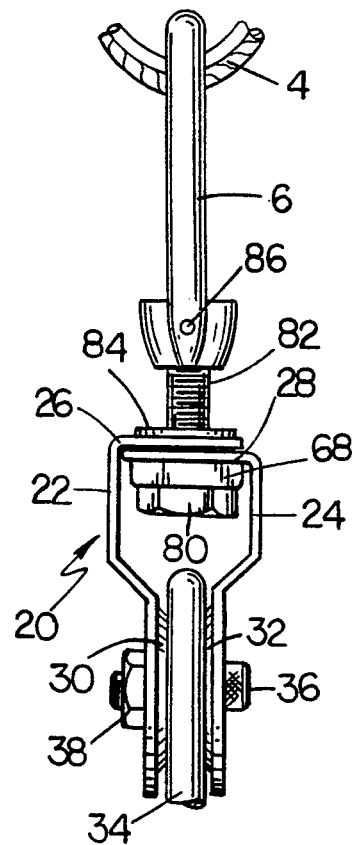
FIG. 3 is a view similar to FIG. 2 but illustrating the collapsible member in the collapsed condition.

A load supporting member 20, FIGS. 2 and 3, comprises a pair of side wall portions 22 and 24 and base portions 26 and 28. As illustrated in FIGS. 2 and 3, the base portions 26 and 28 are in superposed relationship so that openings therein (not shown) are in an aligned relationship. A pair of flange portions 30 and 32 project inwardly from the side wall portions 22 and 24. A swivel snaphook 34, such as that described in U.S. Pat. No. 4,434,536, which is incorporated herein by reference thereto, is attached to the load supporting member 20 by moving the portions 30 and 32 into the hole 11 (in U.S. Pat. No. 4,434,536) of swivel snaphook 34, using an allen head bolt 36 and a nut 38.

Figure 4:
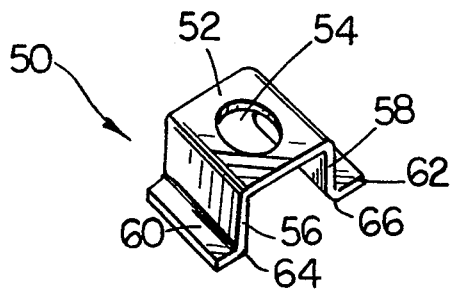
FIG. 4 is a perspective view of the collapsible member in a non-collapsed condition.
Figure 5:
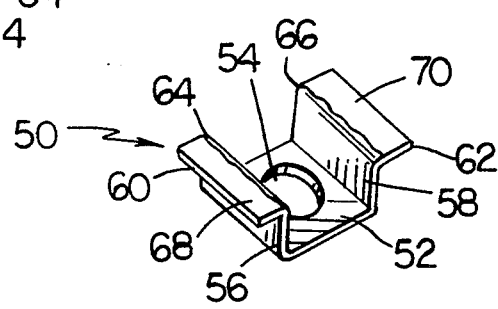
FIG. 5 is an inverted view of FIG. 4.

A collapsible member 50 is illustrated in FIGS. 4 and 5 and comprises a central body portion 52 having an opening 54 formed therein. A pair of spaced apart leg portions 56 and 58 are integral with the central body portion 52 and project outwardly therefrom at an angle of about 90 degrees. Flange portions 60 and 62 project outwardly from the leg portions 56 and 58 and are integrally connected with the leg portions 56 and 58 by arcuate portions 64 and 66. The surfaces 68 and 70 of the flange portions 60 and 62 are chromated to have a distinctive color, such as red, for purposes described below. The collapsible member 50 is preferably formed from a metallic material, such as cold rolled 10—10 steel.

As illustrated in FIGS. 2 and 3, the collapsible member 50 is mounted on the load supporting member 20 using a bolt having a head portion 80 and an externally threaded shank portion 82. The externally threaded shank portion 82 is passed through the opening 54 in the central body portion 52, the openings in the base portions 26 and 28, the opening (not shown) in the washer 84 and is threaded into an internally threaded opening (not shown) in the swivel eye 6. The swivel eye 6 is tightened onto the shank portion 82 until there is a separation of about 0.030 of an inch between it and the washer 84 and is then secured in place using a roll pin 86 in a conventional manner. This permits the swivel eye 6 and the shank portion 82 to rotate relative to the base portions 26 and 28 and the collapsible member 50. When a load is placed on the swivel snaphook 34, the base portion 28 contacts the collapsible member 50.

Figure 6:
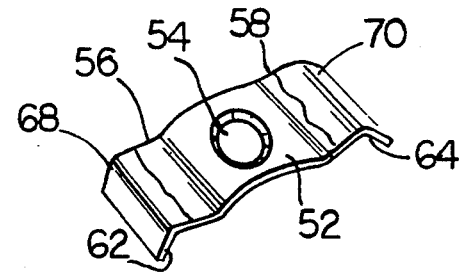
FIG. 6 is a perspective view illustrating the collapsible member of FIG. 5 in a collapsed condition.

In operation, the apparatus is assembled as illustrated in FIGS. 1 and 2. The swivel snaphook 34 is connected to the safety harness of a worker as described in U.S. Pat. No. 4,589,523. The collapsible member 50 is designed to collapse when a predetermined force is placed thereon. This predetermined force should be less than the force at which the fall arresting line will begin to extend. Thus, if the fall arresting apparatus is designed to begin to operate at a force of 450 pounds, the collapsible member 50 should collapse when a force between about 400 and 425 pounds is applied thereto so as not to interfere with the operation of the fall arresting apparatus. This will also permit the worker to perform his regular tasks without collapsing the collapsible member 50. When a worker falls, the force is transmitted through the swivel snaphook 34, the load supporting member 20 and the swivel eye 6 to the fall line 2. The fall line 2 resists the force so that the swivel eye 6 applies a force on the head portion 80 which applies this force to the central body portion 52. When this force reaches the predetermined amount, the central body portion 52 buckles and moves the leg portions 56 and 58 in opposite directions. As the leg portions 56 and 58 continue to move, the surfaces 68 and 70 are exposed, as illustrated in FIG. 3 and 6. After the fall has been arrested, the collapsed collapsible member readily indicates that the fall arresting apparatus had been used.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A device for indicating that a fall arresting apparatus was used to arrest a fall comprising:
   a load supporting member attached to a fall line;
   said load supporting member having a base portion having at least one opening formed therein;
   a collapsible member having spaced apart portions adapted to contact said base portion;
   said collapsible member having a central body portion integral with said spaced apart portions which comprises a pair of integral leg portions projecting from said central body portion, and said central body portion having an opening formed therein;
   mounting means for mounting said collapsible member on said load supporting member, so that said spaced apart portions are at least adjacent to said base portion;
   another load supporting member attached to said fall line; and
   securing means for securing at least a portion of said mounting means to at least a portion of said another load supporting member so that when a predetermined force is applied to said another load supporting member said predetermined force is transmitted to said collapsible member crushing said collapsible member.

2. A device as in claim 1 wherein:
   said spaced apart portions further comprising;
   an integral flange portion projecting from each of said leg portions and located to contact said base portion; and
   said mounting means applying a force on said central body portion to move said central body portion toward said base portion and to apply a force on said pair of integral leg portions to move them in opposite directions as said collapsible member is being collapsed.

3. A device as in claim 2 wherein:
   said flange portions extend in opposite directions.

4. A device as in claim 3 wherein:
   the surface of said flange portions in contact with said base portion have a distinctive color and are clearly visible when said collapsible member has been collapsed.

5. A device as in claim 2 wherein:
   each of said pair of integral leg portions is substantially perpendicular to said central portion; and
   each of said integral flange portions is substantially perpendicular to its associated leg portion.

6. A device as in claim 5 and further comprising:
   an integral arcuate portion between each of said leg portions and flange portions.

7. A device as in claim 1 wherein said mounting means comprise:
   a head portion having a cross-sectional configuration greater than the cross-sectional configuration of said opening in said collapsible member;
   a shank portion projecting from said head portion and passing through said opening in said collapsible member and said at least one opening in said base portion; and
   said securing means securing a portion of said shank portion to said another load supporting member.

8. A device as in claim 7 wherein said securing means comprise:
   an externally threaded portion on said shank portion; and
   an internally threaded opening in said another load supporting member.

9. A device as in claim 7 wherein:
   said spaced apart portions further comprising;
   an integral flange portion projecting from each of said leg portions and adapted to contact said base portion; and
   said mounting means applying a force on said central body portion to move said central body portion toward said base portion and to apply a force on said pair of integral leg portions to move them in opposite directions as said collapsible member is being collapsed.

10. A device as in claim 9 wherein:

said flange portions extend in opposite directions.

11. A device as in claim 10 wherein:
the surface of said flange portions in contact with said base have a distinctive color and are clearly visible when said collapsible member has been collapsed.

12. A device as in claim 9 wherein:
each of said pair of integral leg portions is substantially perpendicular to said central body portion; and
each of said integral flange portions is substantially perpendicular to its associated leg portion.

13. A device as in claim 12 and further comprising:
an integral arcuate portion between each of said leg portions and flange portions.

* * * * *